US005542777A

United States Patent [19]
Johnson

[11] Patent Number: 5,542,777
[45] Date of Patent: Aug. 6, 1996

[54] FASTENER FOR COMPOSITE STRUCTURES

[75] Inventor: Martin E. Johnson, Baltimore, Md.

[73] Assignee: Martin Marietta Corporation, Bethesda, Md.

[21] Appl. No.: 274,063

[22] Filed: Jul. 12, 1994

[51] Int. Cl.⁶ .................................................. F16B 43/02
[52] U.S. Cl. ...................... 403/389; 403/384; 52/787.11; 52/787.12; 411/338; 411/537
[58] Field of Search ................................. 403/384, 388, 403/386, 389; 411/338, 546, 537; 52/309.2, 787.1, 787.11, 787.12

[56] References Cited

U.S. PATENT DOCUMENTS

| | | | |
|---|---|---|---|
| 1,042,831 | 10/1912 | Stafford | 403/389 X |
| 1,046,600 | 12/1912 | Kahler | 403/389 X |
| 2,957,196 | 10/1960 | Kreider et al. | 411/546 X |
| 3,434,262 | 3/1969 | Lawrence | 52/787.12 |
| 3,512,328 | 5/1970 | Eriksson | 52/787.1 |
| 3,771,410 | 11/1973 | Swindt | 411/338 |
| 4,934,861 | 6/1990 | Weeks et al. | 403/388 X |
| 4,981,735 | 1/1991 | Rickson | 52/787.1 X |
| 5,212,003 | 5/1993 | Homer | 428/57 |
| 5,324,146 | 6/1994 | Parenti et al. | 411/82 |

FOREIGN PATENT DOCUMENTS 1193489  11/1959  France ................................. 411/537

Primary Examiner—Anthony Knight
Attorney, Agent, or Firm—Gay Chin; William H. Meise

[57] ABSTRACT

A vehicle includes a composite panel 10 with nonparallel face sheets 12,14, and a reinforcing core 16, preferably honeycomb, lying therebetween. A fastener 30 lies in an aperture 22 of the panel, and includes a socket 32 with a flange 40 bearing against first face sheet 12, and a body 46 defining a through aperture 54 and a spherical cavity 50. Fastener 30 also includes a swivel 34, with a ball-shaped knob 62 rigidly coupled to a post 64. Knob 62 fits into cavity 50 and can swivel. Post 64 is internally and externally threaded. An internally threaded spacer 36 is screwed onto the exterior threads 65 of post 64, to adjust the length of the fastener to the thickness of panel 10. Either post 64 or spacer 36 includes an additional fastening arrangement. In a particular embodiment of the invention, the additional fastening means of the spacer is a flange, and in another embodiment, it is a threaded portion of the bore of the post or of the spacer.

17 Claims, 4 Drawing Sheets

FASTENER FOR COMPOSITE STRUCTURES

FIELD OF THE INVENTION

This invention relates to fasteners for composite structures such as honeycomb-reinforced panels, and more particularly to such fasteners which are adaptable to panels with nonparallel facesheets.

BACKGROUND OF THE INVENTION

Modern aircraft and spacecraft are fabricated from strong, lightweight composite materials. Such composite materials may include metals, metal alloys, polymers, glasses, carbon fibers, and the like. These materials may be formed as reinforced sandwich panels, in which two face sheets are held in a spaced-apart relationship by a reinforcing core. The core material is itself a rigid, lightweight material, such as a foamed or honeycomb structure. In use, aircraft and spacecraft may experience extremes of vibration, stress and temperature, and the structural members, including the sandwich panels and their fasteners, must be appropriate to such use. In the past, such panels have been fastened together by fasteners, such as bolts, or by the low-stress L-shaped joining pieces described in U.S. Pat. No. 5,212,003, issued May. 18, 1993 in the name of Homer. Another joining method is described in U.S. Pat. No. 5,324,146, issued Jun. 28, 1994 in the name of Parenti et al., in which the fasteners are assembled with adhesive in a manner which tends to take up tolerances which build up in the structure during assembly, which thereby tends to reduce the amount of assembly labor.

The requirements placed on such lightweight structures now dictate that, in some cases, the panels be tapered in thickness. In such a tapered-thickness panel, the face sheets are nonparallel, and the reinforcing core must also taper in thickness. It may be difficult to drill a clearance hole having a precise length through such a tapered-thickness panel to accommodate a fastener. Once such a clearance hole is made, the fastener may protrude, and the head may not lie flush with the panel.

Improved panel-to-panel and panel-to-equipment mounting arrangements are desired.

SUMMARY OF THE INVENTION

A vehicle such as an aircraft or spacecraft according to the invention includes a composite panel. The panel includes nonparallel first and second face sheets, and a reinforcing core lying therebetween The reinforcing core may be rigid foam, honeycomb, or other lightweight, rigid material. The panel also including an aperture extending through the first and second face sheets and the core. The aperture defines an axis extending perpendicular to the second face sheet.

A fastener for such a panel includes a socket with a flange having a first surface, and a second surface bearing against the outer surface of the first face sheet in a region around the aperture. The socket further includes a body thicker than the flange, and having a first surface coplanar with the first surface of the flange. The body also defines a circular through aperture centered about a socket axis and having a first diameter, and a cavity in the shape of a portion of a sphere having a second diameter larger than the first diameter, and centered about the socket axis. The spherical cavity extends from the first surface of the flange to the through aperture. The cavity has a first depth, as measured along the socket axis from the circular through aperture to the first surface.

The fastener also includes a swivel, with a knob portion rigidly coupled to a post portion. Both the knob portion and the post portion are centered about a swivel axis. The knob portion of the swivel includes a portion of a ball having the second diameter. The portion of the ball has a dimension, measured along the swivel axis, which is less than the first depth. The post portion of the swivel is in the shape of a hollow circular cylinder threaded on the interior and exterior. The post portion of the swivel extends through the through aperture of the socket, with the knob portion of the swivel contained within the cavity.

A spacer in the form of a circular cylinder is also provided, with the cylinder defining a spacer axis, first and second ends, and a bore. At least a portion of the bore adjacent the first end of the spacer is threaded to match the threaded exterior of the post portion of the swivel. Either the post or the spacer further includes additional fastening means at the end thereof remote from the socket, or nearer the second face sheet, to which another panel, a device, or a bracket for supporting a device may be attached. At least a portion of the threaded portion of the bore of the spacer is threaded onto the post in an amount sufficient so that the fastener may extend through the panel aperture with the flange adjacent to, and flush with, the first sheet, and with the second end of the spacer flush with the outer surface of the second face sheet of the panel, whereby the length of the fastener between the second end of the spacer and the second surface of the flange of the socket equals the length of the aperture between the outer surfaces of the first and second face sheets.

In a particular embodiment of the invention, the additional fastening means of the spacer is a flange, and in another embodiment, it is a threaded portion of the bore through the spacer. The preferred additional fastening means is a threaded bore extending within the post of the swivel, into which a mechanical fastener, such as a screw or bolt, may be attached, as by being threaded thereunto.

DESCRIPTION OF THE DRAWINGS

FIG. 1e is a cross-section of a socket portion of the fastener of FIG. 1a;

FIG. 3b illustrates the reverse sides of the spacer and swivel of FIG. 3a.

DESCRIPTION OF THE INVENTION

Figure 1A:
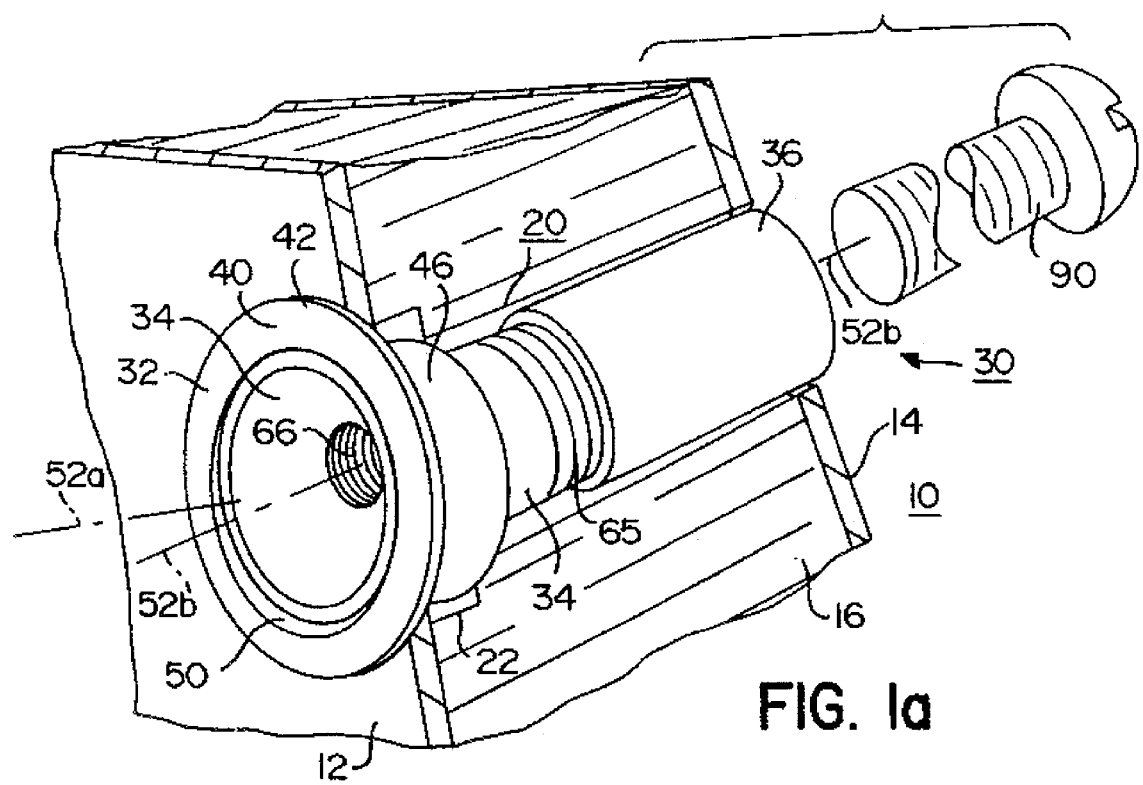
FIG. 1a is a perspective or isometric view, partially cut away, of a panel and fastener according to an aspect of the invention.
Figure 1B:
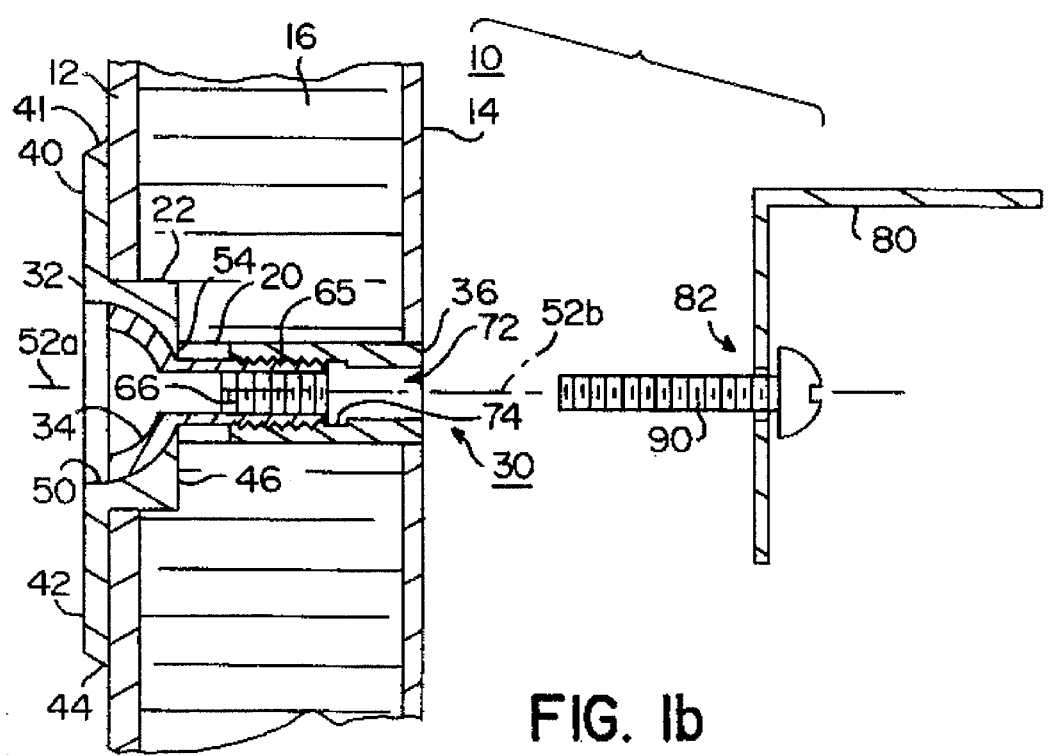
FIG. 1b is a cross-sectional view of the arrangement of FIG.1a when the panel sides are parallel, illustrating how a mounting flange may be attached.
Figure 1C:
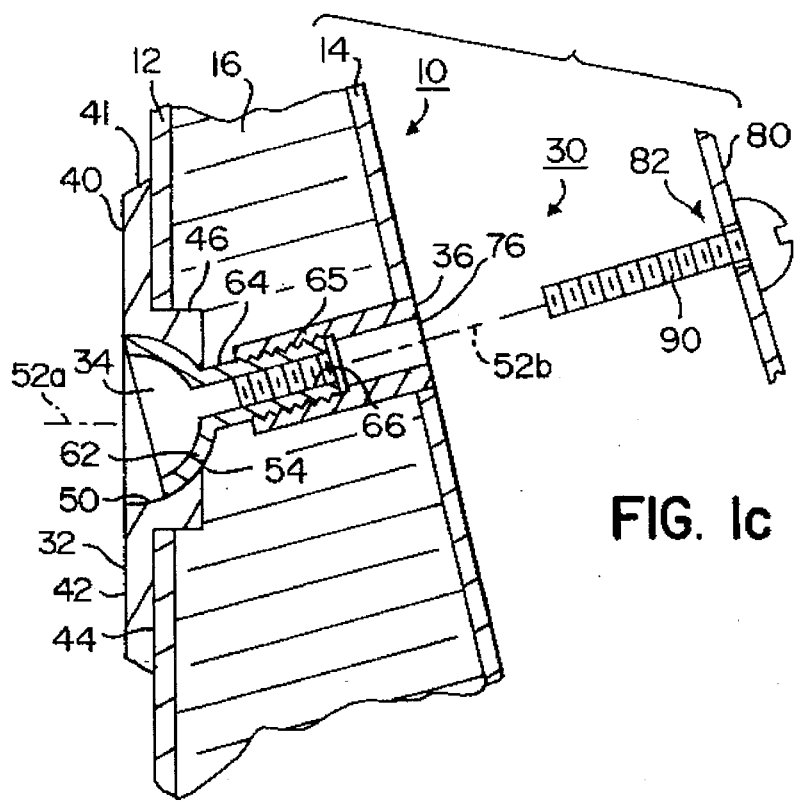
FIG. 1c is a cross-sectional view of the arrangement of FIG. 1a when the panel sides are nonparallel.
Figure 1D:
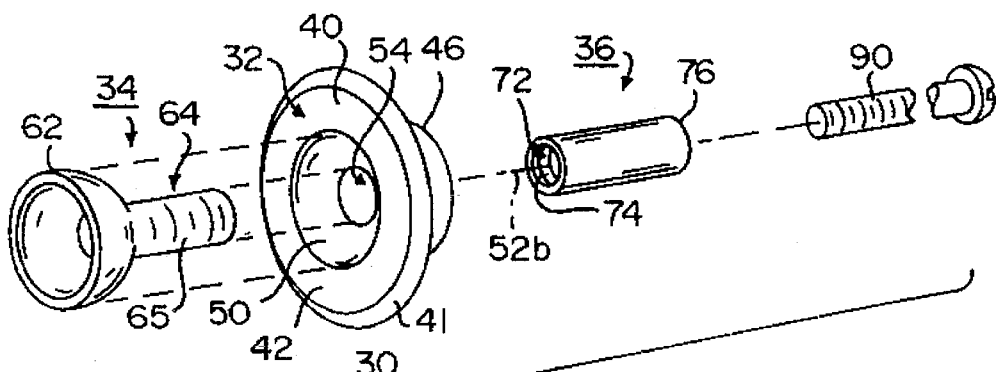
FIG. 1d is a perspective view of the fastener of FIG. 1a, exploded to illustrate details.

In FIGS. 1a, 1b, and 1c, a reinforced composite panel 10 includes a first face sheet 12, and a second face sheet 14 spaced away from face sheet 12 by a low-density core 16, illustrated as a honeycomb. The face sheets and honeycomb may be made from aluminum, alloys, or reinforced resin composites, or other suitable materials. A stepped bore 20 extends through panel 10, with a larger-diameter bore portion 22 adjacent face sheet 12.

Figure 1E:
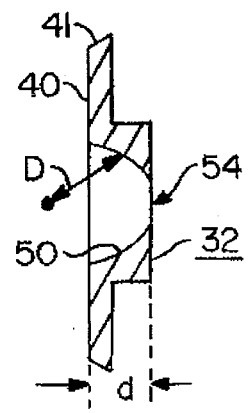

As illustrated in FIGS. 1a, 1b, 1c, and 1d, a fastener 30 extends into bore 20. Fastener 30 includes a socket portion 32, a swivel portion 34, and a spacer portion 36. Socket portion 32 of fastener 30 defines an annular flange 40, which defines an outer surface 42, and an inner surface 44 which bears against the outer surface of face sheet 12. The outermost edge of flange 40 has a taper 41. Socket portion 32 of fastener 30 also includes a body portion 46, which is thicker than flange 40. The outer surface of body 46 is flush and contiguous with the outer surface of flange 42. Body 46 extends into larger-diameter portion 22 of bore 20. A cavity 50 in body 46 is in the form of a portion of a sphere (a semisphere) centered about an axis 52a, which is perpendicular to the outer surface of face sheet 12. The sphere which defines cavity 50 has a predetermined diameter, designated D in FIG. 1e. The fundus of cavity 50 opens into a through aperture 54 having a diameter less than the diameter of the semispherical cavity. Through aperture 54 is centered on axis 52a. The depth of the cavity, measured perpendicularly from outer surface 42 of flange 40 to through aperture 54, is a predetermined distance, designated d in FIG. 1e.

Swivel portion 34 of fastener 30, as illustrated in FIGS. 1a, 1b, 1c, and 1d, includes a knob 62 and a post 64, both symmetric about an axis 52b. Knob 62 is in the shape of a portion of a sphere having diameter D, the same as the diameter of the sphere defining cavity 50, so that knob 62 can fit into cavity 50. As illustrated, knob 62 is hollow for weight reduction. Knob 62 is affixed to, or monolithic with, internally and externally threaded post 64. The external threads of post 64 are designated 65, and the internal threads are designated 66.

In order to allow fastener 30 of FIG. 1a, 1b, 1c, and d to accommodate panels of various thicknesses, and more particularly to exactly fit tapered panels at the location at which the through hole is made, as best illustrated in FIG. 1c, spacer 36 includes a through bore 72, which has internal threads 74 which match (both in diameter and in pitch) the external threads of post 64, at least near the end adjacent post 64. When fastener 30 is mounted in bore 20/22 of panel 10, spacer 36 is screwed onto post 64 until the outside end 76 is flush with the outer surface of face sheet 14. In the absence of this adjustment, the outer edge could not be guaranteed to fit flush.

To affix an object or device, such as a bracket 80 with through hole 82 in FIG. 1b, to panel 10, an externally threaded screw or bolt, illustrated as 90, extends through the hole 82 in bracket 80, through the bore 72 of spacer 36, and is threaded into internal threads 66 inside post 64. As an alternative, internal threads 74 of bore 72 of spacer 36 may extend to the right end of the spacer, and screw or bolt 90 may be dimensioned to fit threads 74 in spacer 36 rather than threads 66 inside port 64. When the bolt is tightened by applying torque thereto, bracket 80 is drawn into abutment with face sheet 14 of panel 10, and lies flush therewith, because of the lack of protrusion of any portion of fastener 30 (except screw 90) past the outer surface of face sheet 14. If through hole 82 is smaller in diameter than the diameter of spacer 36, bracket 80 will bottom against the outer edge of spacer 36 without applying significant compressive pressure between face sheets 12 and 14, whereas if the through hole is larger in diameter than the outer diameter of spacer 36, the panel is compressed.

The advantages of the fastener described in conjunction with FIGS. 1a, 1b, 1c, 1d, and 1e are more apparent when used with a panel with greatly tapered thickness, as illustrated in FIG. 1c. In FIG. 1c, the honeycomb core has the axes of the hexagonal cells perpendicular to face sheet 14, and not to face sheet 12. It is desirable to have the compressive forces due to fasteners applied parallel to the axes of the cells. If a simple nut and bolt or screw were to be used to apply compressive forces to the honeycomb-reinforced panel, only the head or the nut, but not both, could lie flat against the adjacent face sheet, and as a consequence, the forces on the honeycomb, at least near the face sheets, would undesirably include substantial components transverse to the cell axes. With a fastener according to the invention, on the other hand, the "head" portion, corresponding to the flange 40 of socket 32, can lie flat against its face sheet, with its axis 52a perpendicular to the adjacent face sheet 12, and swivel 34 aligns itself along axis 52b, so that the remainder of the fastener is also aligned along axis 52b, whereupon the forces exerted by tightening the fastener are applied parallel to axis 52b, and perpendicular to face sheet 14. If the honeycomb cell axes are initially aligned to be perpendicular to face sheet 14, as illustrated in FIGS. 1b and 1c, the forces will be applied parallel to the cell axes.

Figure 2:
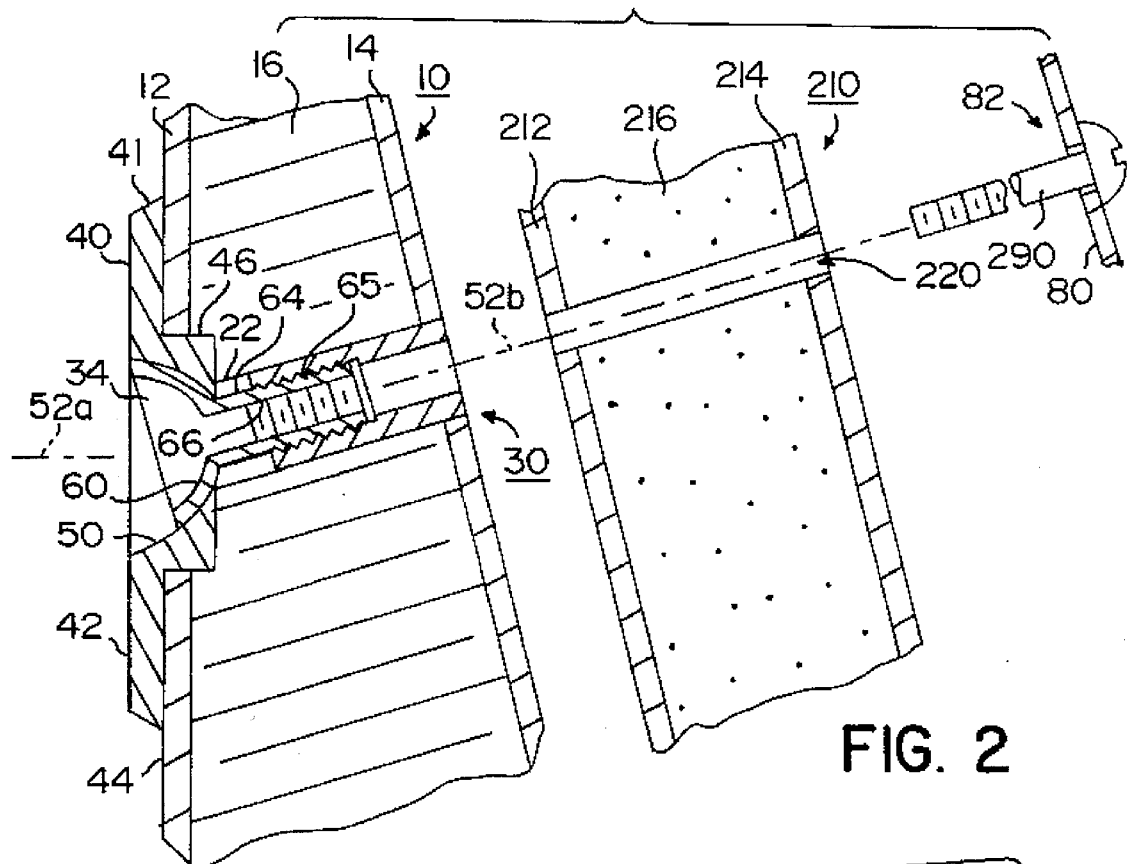
FIG. 2 is a cross-sectional view similar to FIG. 1b, illustrating how the fastener is used with a panel having nonparallel sides.

FIG. 2 illustrates the use of a fastener according to the invention to fasten two reinforced composite panels together. In FIG. 2, panel 10 and fastener 30 correspond to those of FIG. 1c, and an additional nontapered panel 210 includes face sheets 212 and 214, and lightweight, rigid core 216. A through or mounting hole 220 is formed in panel 210. A screw 290, longer than the corresponding screw 90 of FIGS. 1b and c, to account for the greater thickness of panel 210 by comparison with bracket 80, extends through mounting hole 220, through bore 72 extending through spacer 36, and is threaded into the internal threads of post 64. When screw 290 is tightened by application of torque, face sheet 212 of panel 210 is drawn against face sheet 14 of panel 10.

Figure 3A:
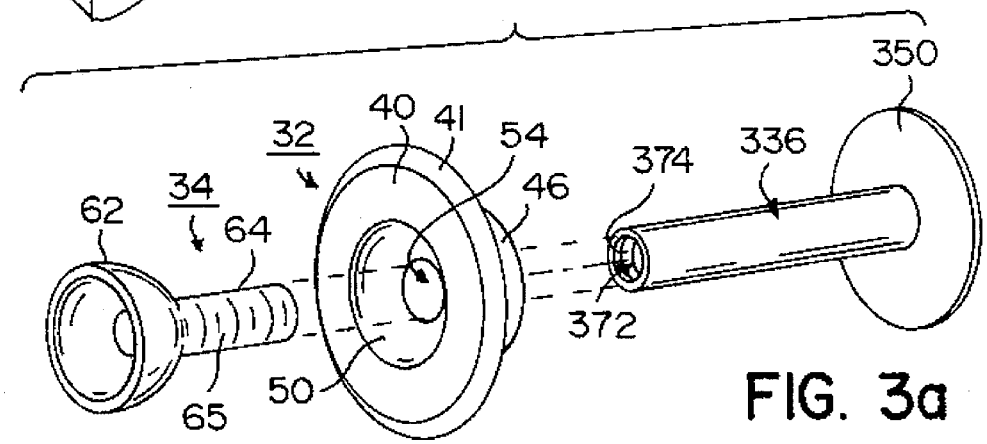
FIG. 3a is a perspective or isometric;view of a fastener according to an aspect of the invention, in which a second flange integral with the spacer is available to bear against a second side of the panel.
Figure 3B:
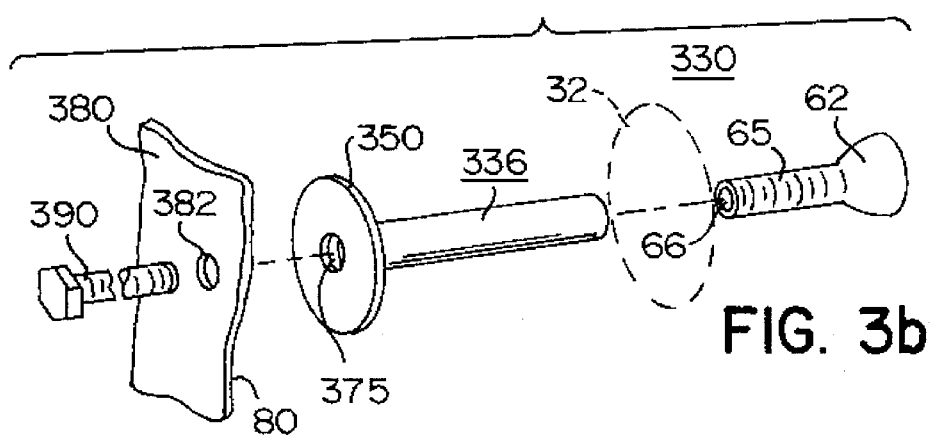

FIG. 3a is an exploded view of another embodiment of the invention. In FIG. 3a, socket 32 and swivel 34 are identical to those of FIG. 1d, but the spacer 336 differs from spacer 36 FIG. 1d in that it includes a flange 350 at, and integral with, the end of the spacer which is remote from post 64 and from socket 32. The flange 350 has an aperture 375 which opens into bore 374, extending through spacer 336, as illustrated in FIG. 3b. FIG. 3b also illustrates a device mounting bracket 380 with a through hole 382 therein. A screw, illustrated as 390, extends through hole 382, and is threaded into either interior threads in spacer bore 375, or preferably into internal threads 66 in a bore in post 64 of swivel 34.

Figure 4A:
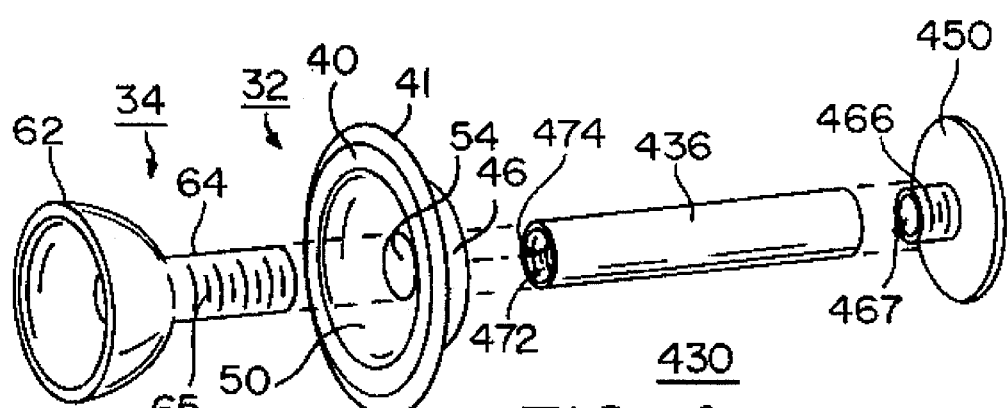
FIGS. 4a and 4b are similar to FIGS. 3a and 3b, except that the spacer and flange are separate.
Figure 4B:
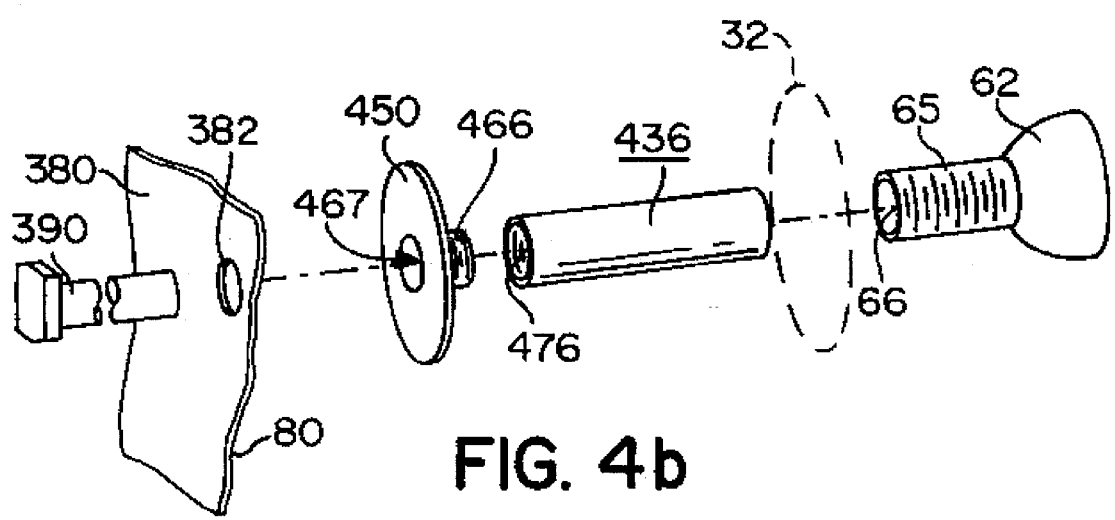

FIGS. 4a and 4b are similar to FIGS. 3a and 3b, and corresponding elements are designated by the same reference numerals. Spacer 436 of FIG. 4a and 4b differs from spacer 336 of FIGS. 3a and 3b in that it is internally threaded at the end near post 64 to match threads 65, and is also internally threaded with threads on the end remote from post 64, to match the external threads on threaded post 466 of flange 450. Flange 450 and post 466 define a bore 467 which is dimensioned to clear the body of screw 390, so that screw 390 can be threaded into threads 66 of post 64. As an alternative, screw 390 may be screwed into internal threads (not illustrated) within bore 467 of flange 450 and post 466.

Other embodiments of the invention will be apparent to those skilled in the art. For example, the internal threads 74 of spacer 36 may extend all the way through its internal bore 72, rather than ending at a location within the spacer, as illustrated. If desired, one or more washers may be used under the heads of screws 90 or 290 to prevent damage to the face sheets on which they bear, or to lock them in place, or for other reasons.

What is claimed is:

1. A fastener for fastening to a composite panel including a nonparallel first and second face sheets and a reinforcing core lying therebetween, said panel also including an aperture extending through said first and second face sheets and said core, said aperture comprising an axis extending perpendicular to said second face sheet, said fastener comprising:

a socket, said socket including a flange with a first surface, and with a second surface for bearing against said first face sheet in a region around said aperture, said socket further including a body thicker than said flange and including a first surface coplanar with said first surface of said flange, said body also defining a through aperture lying about a socket axis and having a first diameter, and a cavity in the shape of a portion of a sphere having a second diameter larger than said first diameter, and centered about said socket axis, said spherical cavity extending from said first surface to said through aperture, said cavity having a first depth, as measured along said socket axis from said circular through aperture to said first surface;

a swivel, said swivel including a knob portion rigidly coupled to a post portion, with both said knob portion and said post portion centered about a swivel axis, said knob portion of said swivel including a portion of a ball having said second diameter, said portion of said ball having a dimension, measured along said swivel axis, which is less than said first depth, said post portion of said swivel being in the shape of a circular cylinder threaded on the exterior, said post portion of said swivel extending through said through aperture of said socket, with said knob portion of said swivel being contained within said cavity;

a spacer in the form of a circular cylinder defining a spacer axis and first and second ends, and a bore, at least a portion of said bore adjacent said first end being threaded to match said threaded exterior of said post portion of said swivel, said threaded portion of said bore of said spacer being threaded onto said post, whereby said fastener may extend through said aperture with said flange adjacent to, and flush with, said first sheet, one of said post and said spacer further including additional fastening means at locations on said one of said post and said spacer which are nearest said second face sheet for having a device fastened thereto.

2. A fastener according to claim 1, wherein said additional fastening means comprises:

a second bore portion adjacent said second end of said spacer, said second bore portion being threaded to receive a screw; and an externally threaded screw threaded into said second bore.

3. A fastener according to claim 2, wherein said additional fastening means further comprises:

an internally threaded bore through at least a portion of said post and parallel to said swivel axis; and an externally threaded screw extending through said bore of said spacer and threaded into said internally threaded bore of said post.

4. A fastener according to claim 1, wherein said additional fastening means comprises:

a second flange extending radially from said spacer axis.

5. A vehicle, comprising:

a composite panel including nonparallel first and second face sheets and a reinforcing core lying therebetween, said panel also including an aperture extending through said first and second face sheets and said core, said aperture defining an axis extending perpendicular to said second face sheet, said fastener comprising:

a socket, said socket including a flange with a first surface, and with a second surface bearing against the outer surface of said first face sheet in a region around said aperture, said socket further including a body thicker than said flange and including a first surface coplanar with said first surface of said flange, said body also defining a through aperture about a socket axis and having a first transverse dimension, and a cavity in the shape of a portion of a sphere having a second diameter larger than said first diameter, and centered about said socket axis, said spherical cavity extending from said first surface to said through aperture, said cavity having a first depth, as measured along said socket axis from said circular through aperture to said first surface;

a swivel, said swivel including a knob portion rigidly coupled to a post portion, with both said knob portion and said post portion centered about a swivel axis, said knob portion of said swivel including a portion of a ball having said second diameter, said portion of said ball having a dimension, measured along said swivel axis, which is less than said first depth, said post portion of said swivel being in the shape of an externally threaded circular cylinder, said post portion of said swivel extending through said through aperture of said socket, with said knob portion of said swivel being contained within said cavity; and a spacer in the form of a circular cylinder defining a spacer axis and first and second ends, and a bore, at least a portion of said bore adjacent said first end being threaded to match said threaded exterior of said post portion of said swivel, at least a portion of said threaded portion of said bore of said spacer being threaded onto said post in an amount sufficient so that said fastener may extend through said aperture with said flange adjacent to, and flush with, said first sheet, and with said second end of said spacer flush with the outer surface of said second face sheet of said panel, at least one of said post and said spacer further including additional fastening means located on that portion of said one of said post and said spacer nearest said second face sheet, whereby the length of said fastener between said second end of said spacer and said second surface of said flange of said socket equals the length of said aperture between said outer surfaces of said first and second face sheets.

6. A vehicle according to claim 5, wherein said additional fastening means further comprises:

an internally threaded bore through at least a portion of said post and parallel to said swivel axis; and an externally threaded screw extending through said bore of said spacer and threaded into said internally threaded bore of said post.

7. A vehicle according to claim 5, further comprising:

an object to be coupled to said panel, said object including a through hole; and wherein said additional fastening means further comprises:

an internally threaded bore through at least a portion of said post and parallel to said swivel axis; and an externally threaded screw extending through said through hole in said object and said bore of said spacer, and threaded into said internally threaded bore of said post.

8. A vehicle according to claim 5, wherein said additional fastening means comprises:

a second bore portion adjacent said second end of said spacer, said second bore portion being threaded to receive a screw; and an externally threaded screw threaded into said second bore.

9. A vehicle according to claim 5, further comprising:

an object to be coupled to said panel, said object including a through hole; and wherein said additional fastening means further comprises:

a second bore portion adjacent said second end of said spacer, said second bore portion being threaded to receive a screw; and an externally threaded screw extending through said through hole in said object and threaded into said second bore portion.

10. A vehicle according to claim 5, wherein said additional fastening means comprises:

a second flange extending radially from said spacer axis adjacent said second end of said spacer, and flush with said outer surface of said second face sheet.

11. A vehicle according to claim 10, wherein said additional fastening means further comprises:

an internally threaded bore through at least a portion of said post and parallel to said swivel axis; and an externally threaded screw extending through said bore of said spacer and threaded into said internally threaded bore of said post.

12. A vehicle according to claim 5, further comprising:

an object to be coupled to said panel, said object including a through hole; and wherein said additional fastening means further comprises:

an internally threaded bore through at least a portion of said post and parallel to said swivel axis; and an externally threaded screw extending through said through hole in said object and said bore of said spacer, and threaded into said internally threaded bore of said post.

13. A vehicle according to claim 10, wherein said additional fastening means comprises:

a second bore portion adjacent said second end of said spacer, said second bore portion being threaded to receive a screw; and an externally threaded screw threaded into said second bore.

14. A vehicle according to claim 5, wherein said reinforcing core of said panel is in the form of honeycomb cells having axes perpendicular to said second face sheet.

15. A vehicle according to claim 14, wherein said additional fastening means comprises:

a second flange extending radially from said spacer axis adjacent said second end of said spacer, and flush with said outer surface of said second face sheet, whereby when said spacer is tightened onto said post, the forces acting upon said core lie substantially parallel to said cell axes.

16. A vehicle according to claim 14, wherein said additional fastening means further comprises:

an internally threaded bore through at least a portion of said post and parallel to said swivel axis; and an externally threaded screw extending through said bore of said spacer and threaded into said internally threaded bore of said post.

17. A fastener according to claim 14, wherein said additional fastening means comprises:

a second bore portion adjacent said second end of said spacer, said second bore portion being threaded to receive a screw; and an externally threaded screw threaded into said second bore, whereby when said screw is tightened onto said post, the forces acting upon said core lie substantially parallel to said cell axes.

* * * * *